(12) United States Patent
Schie

(10) Patent No.: US 11,623,221 B1
(45) Date of Patent: Apr. 11, 2023

(54) IN-FEED ROLLER FOR A WOOD CHIPPER AND METHOD OF MAKING THEREOF

(71) Applicant: Kurt M. Schie, Akron, NY (US)

(72) Inventor: Kurt M. Schie, Akron, NY (US)

( * ) Notice: Subject to any disclaimer, the term of this patent is extended or adjusted under 35 U.S.C. 154(b) by 0 days.

(21) Appl. No.: 17/672,476

(22) Filed: Feb. 15, 2022

(51) Int. Cl.
| | | |
|---|---|---|
| *B02C 4/30* | (2006.01) | |
| *B27L 11/00* | (2006.01) | |
| *B02C 18/22* | (2006.01) | |

(52) U.S. Cl.
CPC ............ *B02C 4/30* (2013.01); *B02C 18/2283* (2013.01); *B27L 11/002* (2013.01)

(58) Field of Classification Search
CPC ... B02C 4/30; B02C 18/2283; B02C 18/2225; B02C 18/002
See application file for complete search history.

(56) References Cited

U.S. PATENT DOCUMENTS

| | | | | |
|---|---|---|---|---|
| 152,289 | A | * | 6/1874 | Huhges ................... D01B 1/22 19/30 |
| 2,263,440 | A | * | 11/1941 | Hansen ................... D02H 3/00 19/94 |
| 2,269,552 | A | * | 1/1942 | Ratkowski ............... B02C 4/30 29/895.21 |
| 4,085,573 | A | | 4/1978 | Marsh |
| 4,229,932 | A | | 10/1980 | Persoons et al. |
| 4,258,778 | A | | 3/1981 | Upton et al. |
| 5,681,251 | A | * | 10/1997 | Shew ....................... D21F 1/02 492/46 |
| 9,591,806 | B2 | | 3/2017 | Farley et al. |
| 10,507,469 | B2 | | 12/2019 | Schie |
| 2016/0263580 | A1 | * | 9/2016 | Rhea ....................... B02C 4/30 |
| 2021/0254278 | A1 | | 8/2021 | Honig et al. |

FOREIGN PATENT DOCUMENTS

| | | |
|---|---|---|
| CA | 3019727 C | 2/2020 |
| CA | 3050946 A1 | 2/2021 |

* cited by examiner

*Primary Examiner* — Faye Francis
(74) *Attorney, Agent, or Firm* — James C. Simmons

(57) ABSTRACT

An in-feed roller for a wood chipper and a process of making thereof. The roller has seven, eight, or nine perimetric planar sides. It is made by providing a plurality of curved plates equal to the number of sides and a pair of end plates having a plurality of perimetric edges equal to the number of sides. Each curved plate has a side portion for extending between respective edges of the end plates, a knife portion, and a junction portion at the junction of the side portion and the knife portion. First tab and slot connections attach the side portions of the curved plates to the edges of the end plates respectively. Second tab and slot connections attach the terminal edges of the side portions of the curved plates to the junction portions of adjacent curved plates respectively.

16 Claims, 6 Drawing Sheets

IN-FEED ROLLER FOR A WOOD CHIPPER AND METHOD OF MAKING THEREOF

The present invention relates generally to wood chippers. More particularly, the present invention relates to an in-feed roller for a wood chipper and to a method for making the roller.

My U.S. Pat. No. 10,507,469, which is incorporated herein by reference, discloses a wood chipper in which wood to be chipped is fed between two rollers wherein one or both rollers is driven and has cutting elements thereon for grasping wood branches or the like by pinching the wood material between a blade on a roller and another roller, allowing the rotation of the rollers to advance the branches into a chamber. A heavy steel flywheel, in the form of a circular disc having opposite surfaces, is rotatably received in the chamber for chipping the wood material into fine chips, which are then discharged from the chipping chamber into a chute for passage out of the wood chipper. The proximate surface (as the wood pieces enter the chamber) of the flywheel has attached thereto with bolts (or other suitable fasteners) at least one but preferably two or four elongate radially positioned knives circumferentially generally equally spaced about the flywheel surface for cutting the wood material into chips. Associated with each knife is a radial slot which extends through the thickness of the flywheel for routing the chips to the other (distal) side thereof. For each knife or slot, an elongate radial fan blade or fin or deflector is welded to the distal surface to direct the chips passing through the respective slot to the chute for passage out of the wood chipper. Other examples of wood chippers are found in U.S. Pat. No. 7,878,434 and in Canadian patent documents 3019727 and 3050946, which are also incorporated herein by reference.

Some chippers are known which may use just a single roller, wherein the wood material is pinched between the blades of the single roller and the base of the in-feed bin and advanced into the chamber to be chipped by the rotating flywheel.

Multi-sided rollers for applications other than in-feed cutting of wood products in a wood chipper are found in U.S. Pat. Nos. 4,085,573, 4,229,932, 4,258,778, and 9,591,806 and U.S. published application 2021/0254278, all of which are incorporated herein by reference.

In the prior cylindrical in-feed rollers, a fixture is undesirably required to align the blades on a cylindrical tube.

It is accordingly an object of the present invention to provide a wood chipper in-feed roller which does not require such a fixture for manufacture thereof.

It is another object of the present invention to provide such a roller which can produce deeper and more aggressive bites into wood product than can be produced in similarly sized cylindrical rollers.

It is a further object of the present invention to provide such a roller which can be made by a less expensive and quicker process.

It is yet another object of the present invention to provide such a roller which has improved strength and is aesthetically pleasing.

In order to provide a wood chipper in-feed roller which can be made by a less expensive and quicker process (including not having to use such a fixture) as well as achieve a deep aggressive bite, the roller has seven, eight, or nine planar sides and is constructed with a plurality of curved plates corresponding to the sides which curved plates are slot and tab connected to each other and to end plates.

The above and other objects, features, and advantages of the present invention will be apparent in the following detailed description of the preferred embodiment(s) when read in conjunction with the appended drawings in which the same reference numerals depict the same or similar parts throughout the several views.

DETAILED DESCRIPTION OF THE PREFERRED EMBODIMENT(S)

Figure 1:
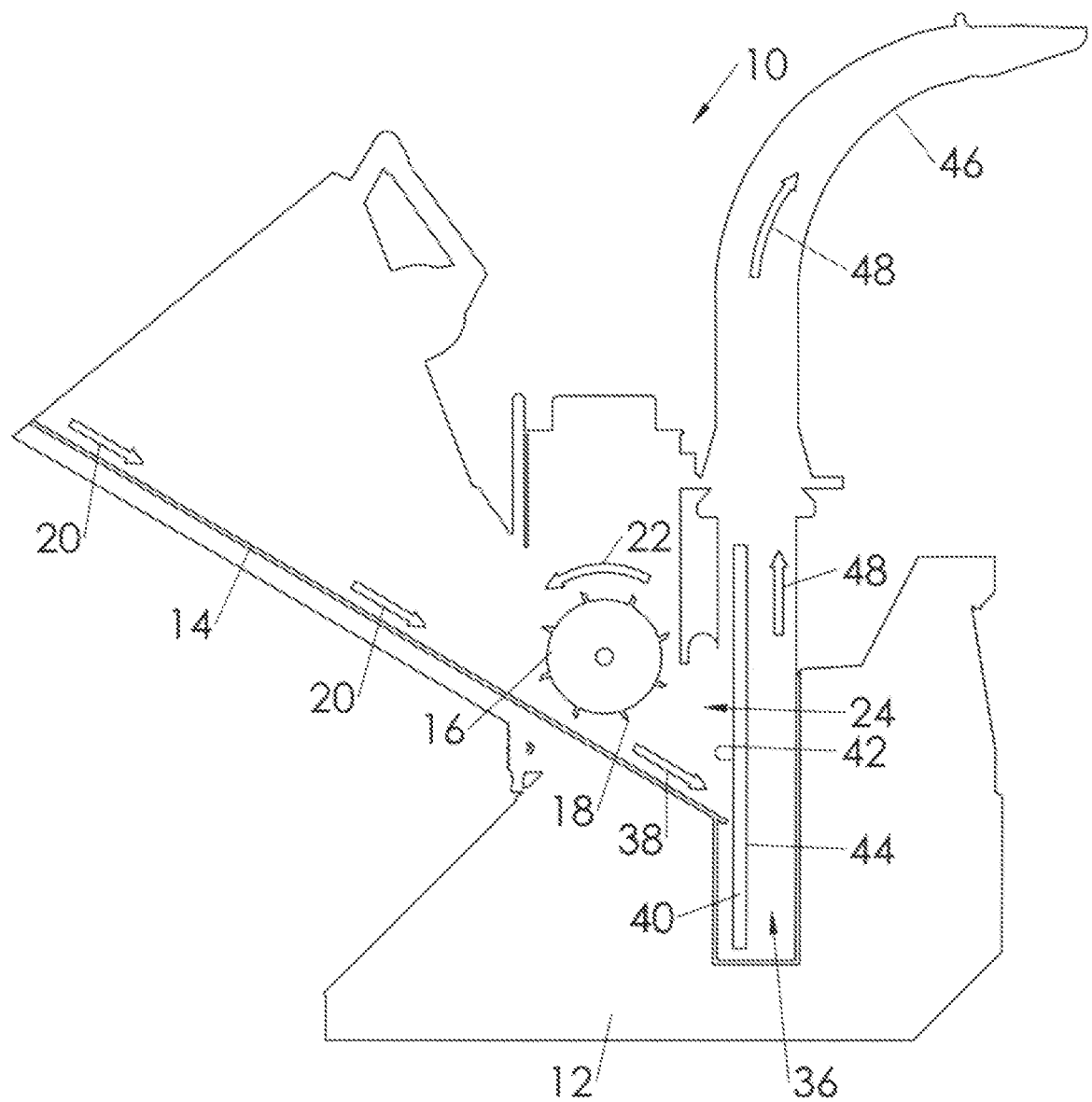
FIG. 1 is a perspective view, with parts broken away to show schematically an in-feed roller and a flywheel, of a wood chipper which embodies the present invention.

Referring to FIG. 1, there is shown schematically generally at 10 a wood chipper which includes a housing 12, an inlet chute 14, a roller 16 (shown schematically, with the particular details of shape and other features contained in other figures) having knives 18 (teeth) for receiving a wood product such as brush, tree branches, and the like passing along the inlet chute 14. The wood material is grasped by pinching it between blades 62 on the ends of the knives 18 and the base of the in-feed bin 14, thereby causing the blades 62 to bite into the wood product and allowing the rotation of the roller to advance the wood material through an opening, illustrated at 24, into a chipping chamber, illustrated at 36, as illustrated at 38. When the term is used herein and in the claims with reference to the roller 16, a knife is defined herein and in the claims as an instrument for effecting the grasping and pinching of wood product between a blade on the end of the knife and an object such as another roller or an in-feed bin.

The in-feed roller 16, which rotates counterclockwise as illustrated at 22 and which is driven as shown and discussed in my aforesaid U.S. Pat. No. 10,507,469, may alternatively be paired with a second driven or non-driven in-feed roller for passage of wood material between the pair of in-feed rollers, as also shown and discussed in my aforesaid U.S. Pat. No. 10,507,469.

In the chipping chamber 36, the flywheel, illustrated schematically at 40 in FIG. 1, having knives on its proximate surface 42, rotates to effect chipping of the wood material into fine pieces which may be called chips, and the chips are passed through slots in the flywheel 40 and out to the distal side 44 of the flywheel 40, where the chips are suitably routed by paddles or fins to exit through an exit chute 46, as illustrated at 48. My aforesaid U.S. Pat. No. 10,507,469 discusses a wood chipper and the functioning thereof in greater detail.

Figure 2:
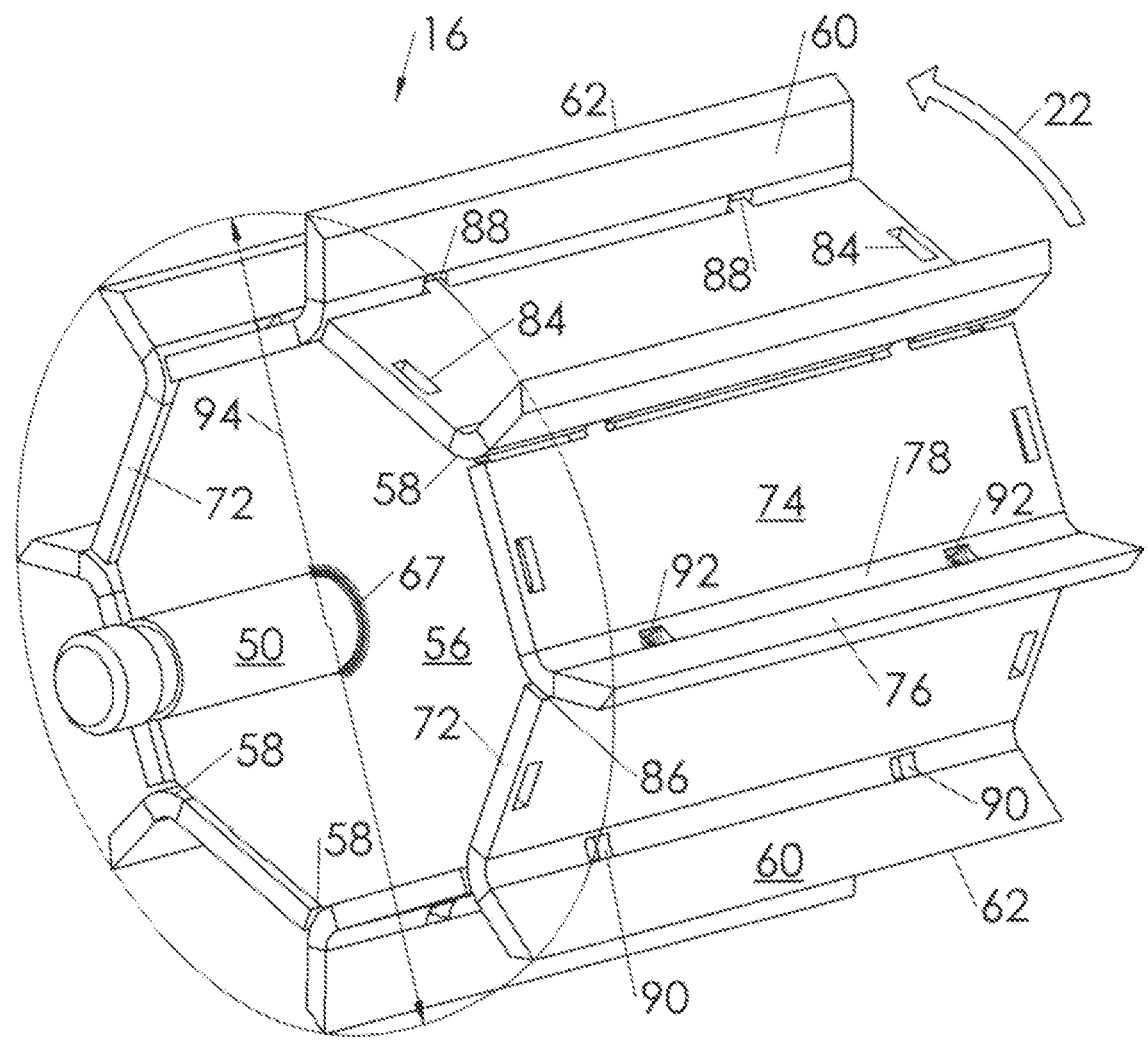
FIG. 2 is a perspective view of the roller enlarged and showing its shape.
Figure 3:
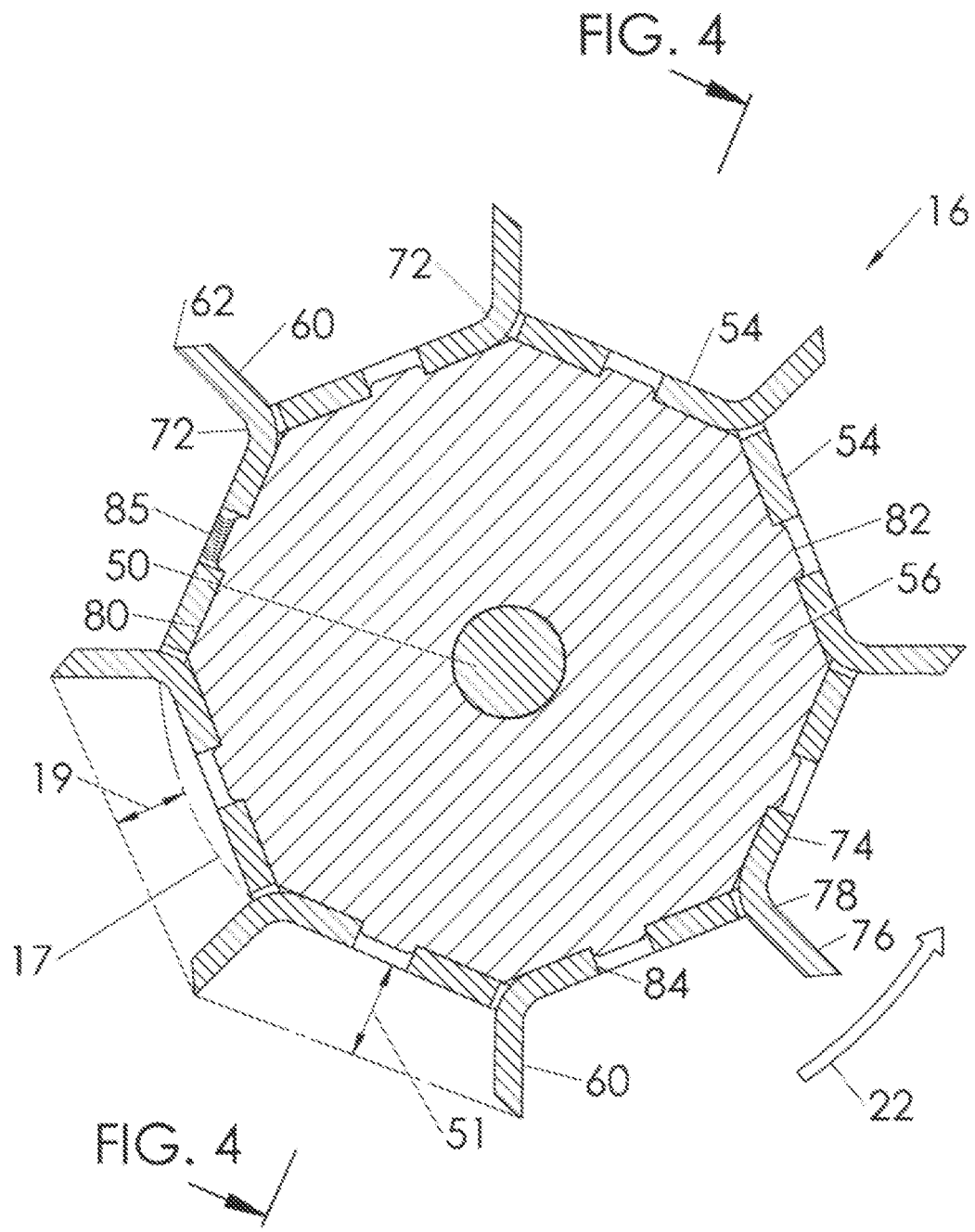
FIG. 3 is a section view of the roller, taken along lines 3-3 of FIG. 4.
Figure 4:
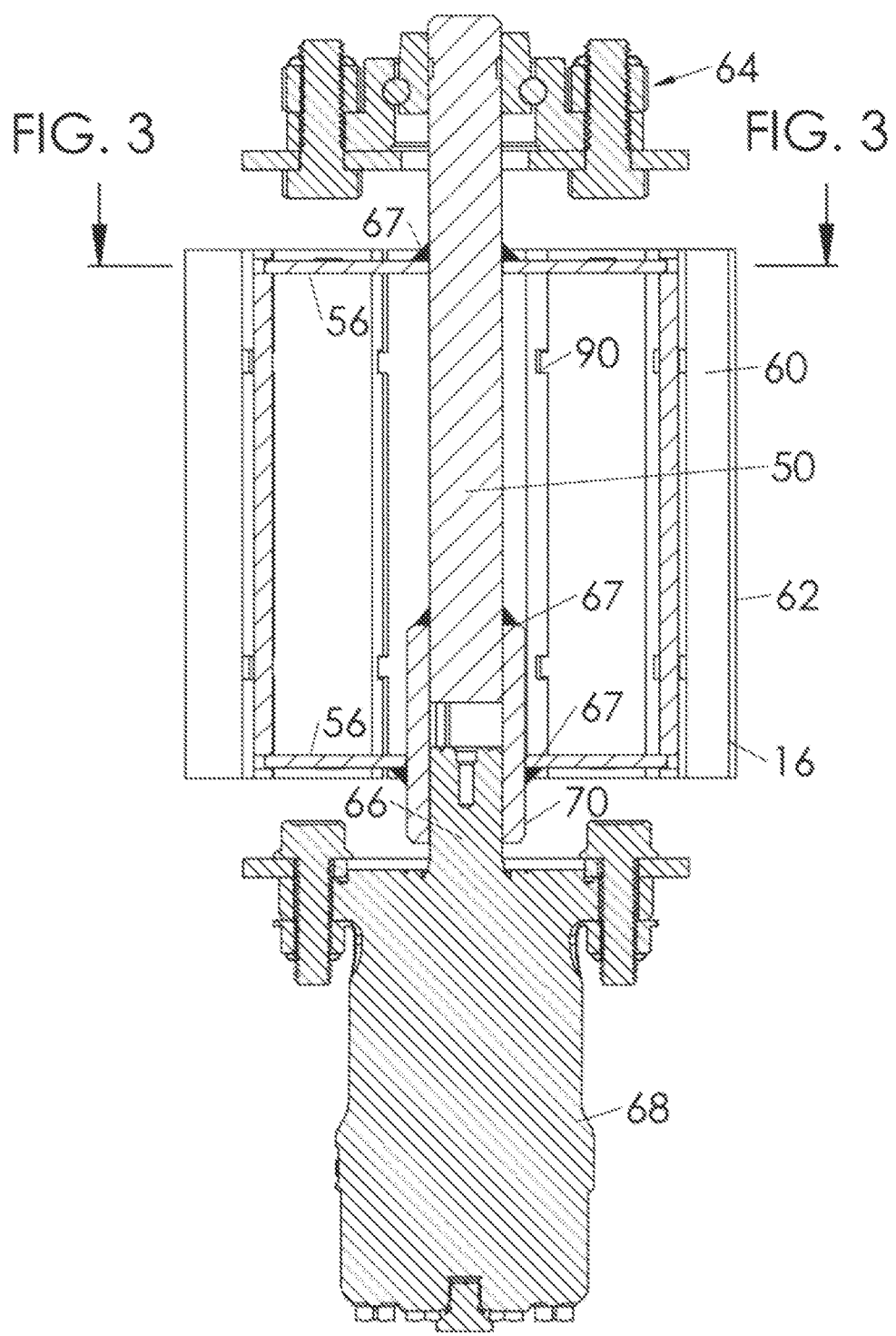
FIG. 4 is a section view of the roller connected to a power source, taken along lines 4-4 of FIG. 3.

Referring to FIGS. 2 to 4, there is shown the roller 16 in greater detail, including its shape, and the roller 16 is made of steel or other suitable material. As seen therein, the roller 16 is rotatable about a rotational axis or shaft 50. Knifes 60 extend radially outwardly from the perimeter of the roller 16 and terminate radially outwardly thereof in the blades 62.

As illustrated in FIG. 3, when a roller is cylindrical, as illustrated at 17 and as in the prior art, the depth of bite for the blades 62 is limited to that illustrated at 19. In order to advantageously achieve a greater bite depth for a desirably more aggressive bite, as illustrated at 51, in accordance with the present invention, the roller 16 has a plurality of substantially identical perimetric planar sides 54 each extending axially between two roller end plates 56 and suitably attached to each other and to the end plates 56 as discussed hereinafter. By "perimetric" is meant that the sides 54 are arrayed or arranged one after the other entirely around the axis 50. As used herein and in the claims, the term "axially" refers to a direction along the shaft or axis of rotation 50, and the term "radially" refers to a direction outwardly from or inwardly toward the shaft or axis of rotation 50.

Figure 5:
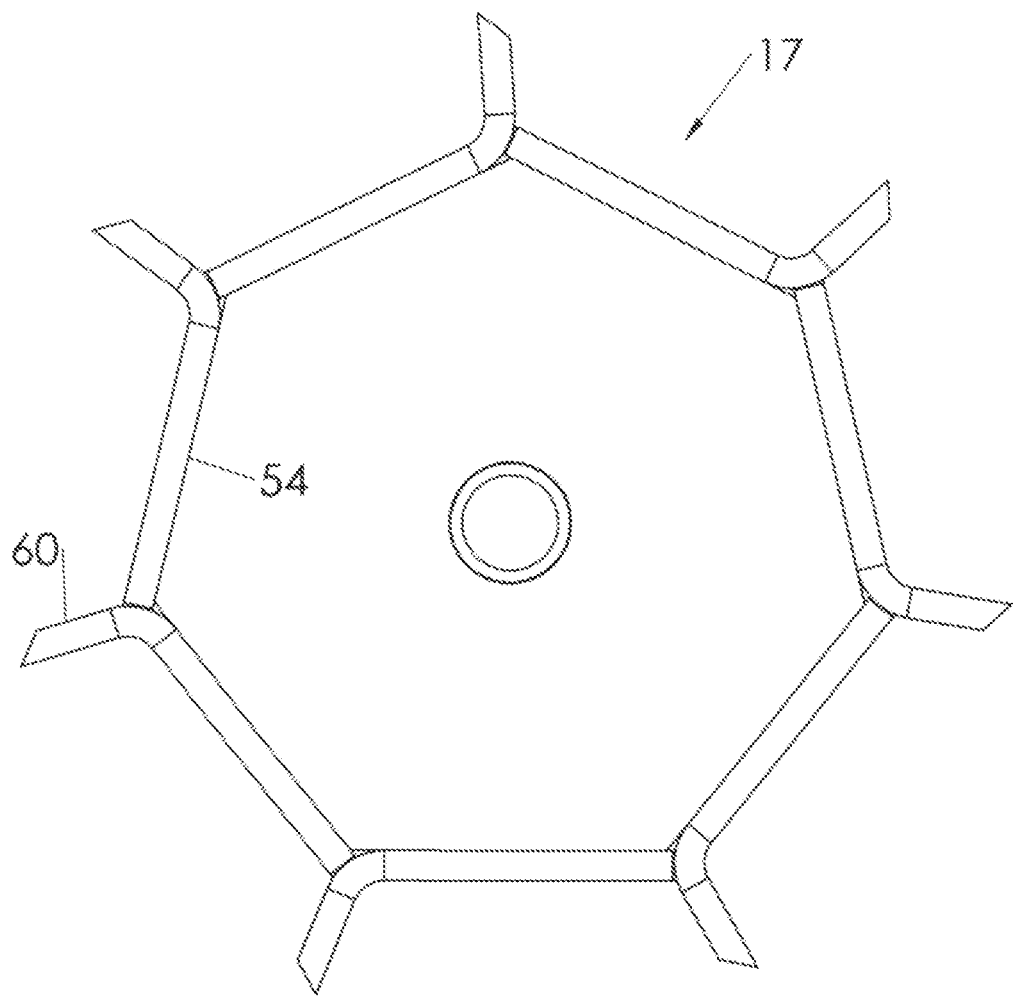
FIG. 5 is a schematic view of an alternative embodiment of the roller, wherein the roller has seven sides.
Figure 6:
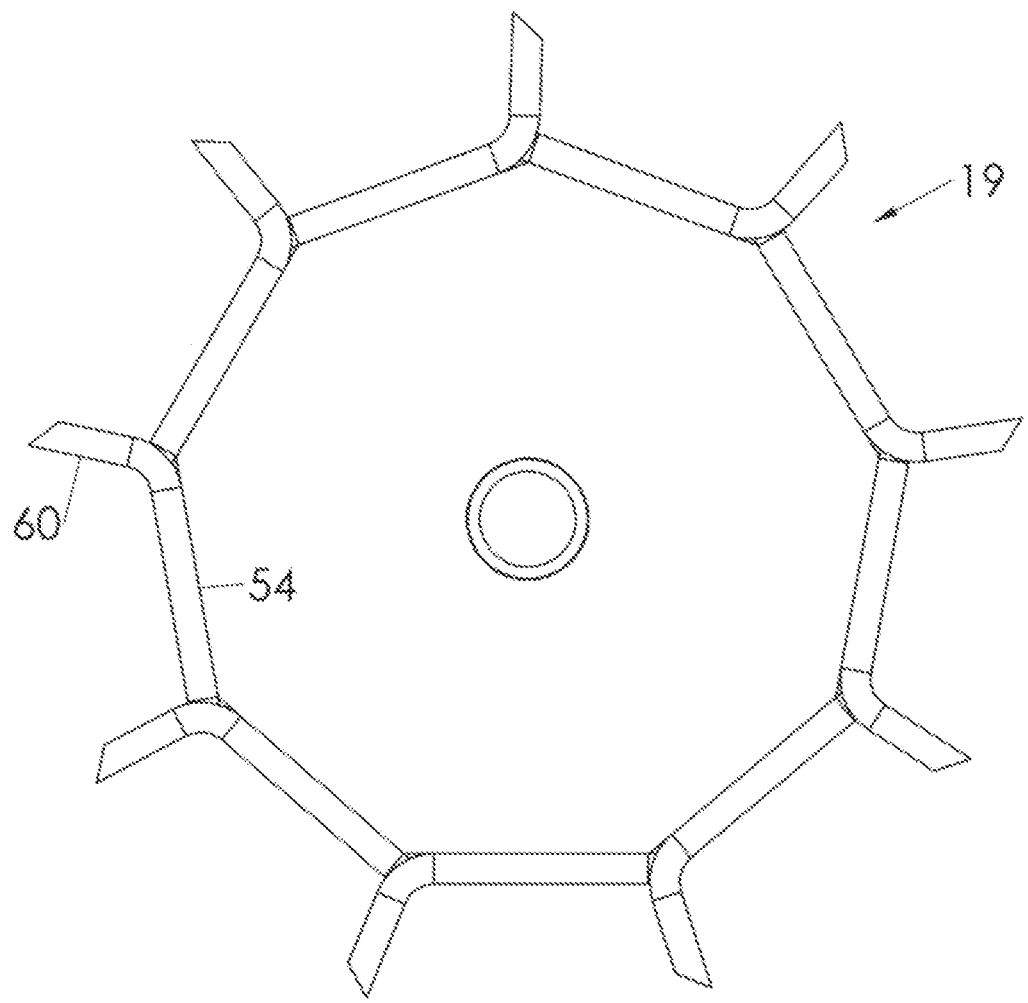
FIG. 6 is a schematic view of another alternative embodiment of the roller, wherein the roller has nine sides.

There is a sweet spot where the number of roller sides 54 may be said to be just right. Thus, the knifes 60 must be spaced apart enough to adequately receive wood products between them (like a bed of nails, where they lose their effectiveness when too close together), but not so far apart as to reduce the effectiveness over each rotation of the roller or have areas of no-grab (for example, a four-sided roller would be expected to inefficiently move only half of wood product over each rotation as compared to an eight-sided roller). In accordance with the present invention, it has been found that the ideal roller 16 (which best serves both of the above criteria) has eight perimetric sides 54 with the corresponding eight knives 60 (as seen in FIGS. 2 and 3). It has also been found that, as illustrated respectively in FIGS. 5 and 6, a roller 17 having seven perimetric sides 54 with seven knives 60 and a roller 19 having nine perimetric sides with nine knives also reasonably meets the above criteria, but that rollers having 6 or less sides with six or less knives are considered too inefficient (move too little wood per rotation) and that rollers having ten or more sides with ten or more knives would be considered too ineffective (acting like a bed of closely spaced nails). The reduction of knives for the number of sides would result in manufacturing difficulties as can be seen hereinafter as well as reduce the effectiveness of bite for the number of knives (it is best to limit the number of sides to the number of knives for the most effective bite).

Junctions 58 (extending axially between the end plates 56) are defined where adjacent sides 54 meet and are attached. These junctions 58 have the appearance of apexes. Extending radially from each junction 58 is a knife 60 terminating radially outwardly thereof in a blade 62.

As seen in FIG. 4, the shaft or rotor 50 extends out one end of the roller 16 where it is supported by suitable conventional bearings 64 in accordance with principles commonly known to those of ordinary skill in the art to which the present invention pertains and therefore will not be discussed further herein. The other end of the shaft 50 is suitably attached to the shaft 66 of a suitable source 68 for powering the roller 16 by means of a suitable coupling member or sleeve 70 which is seen to extend outwardly from the roller 16, and suitable welds applied, as illustrated at 67. The power source 68 may, for example, be a hydraulic pump of a conventional system, or be a hydraulic motor powered by a hydrostatic pump, or be driven by a mechanical gearbox or electric motor, or may be any other suitable power source. Since it is not further necessary to an understanding of the present invention, the power source 68 will not be otherwise described herein.

Heretofore, the making of a cylindrical roller has undesirably required a fixture to align knives on a cylindrical tube, raw pipe material, and dynamic balancing. In order to make the roller 16 easier and faster and without the need for such a fixture or raw pipe material or dynamic balancing, in accordance with the present invention, a plurality of substantially identical curved members 72 (equal to the number of sides 54) are made and attached together and to the end plates 56 as hereinafter discussed.

Each curved member 72 is made of plate (composed of steel or other suitable material) suitably formed to have a portion 74 corresponding to or defining a side 54 and a portion 76 corresponding to or defining a knife 60. The side portion 74 and knife portion 76 are defined by a bend or curvature in the member 72 which will be referred to herein as a junction portion 78.

Each edge 80 of each end plate 56 has a central tab 82 (or alternatively more than one tab, suitably spaced) extending radially outwardly therefrom. These tabs 82 engage or are received in complementary slots 84 in the side portions 74 respectively, and suitable plug welds, illustrated at 85, applied, for attachment of the members 72 to the end plates 56.

The terminal edge 86 of each side portion 74 has a pair (or alternatively one or another number, suitably spaced) of suitably spaced tabs 88 extending outwardly therefrom. These tabs 88 engage or are received in complementary slots 90 in the junction portions 78 respectively, and suitable plug welds, illustrated at 92, applied, for attachment of the members 72 to adjacent ones of the members 72.

While the roller size may vary, the blade to blade diameter, illustrated at 94, of the roller 16 may, for example, be about 8.156 inches, and its length may, for example, be about 7.25 inches. For such a roller 16, the bite distance 51 (FIG. 3) may, for example, be about 0.80 inch as compared to a bite distance 19 for a comparable conventional cylindrical roller of about 0.63 inches. Thus, the roller 16 of the present invention is provided to achieve a more aggressive and effective bite.

Thus, the tab and slot connections and welding are provided to achieve a robust firm stable roller for providing improved strength from constantly varying forces as are found in a wood chipper, and with a desirably aesthetic appeal. Such a robust roller is easier to manufacture since a fixture is not needed to align the knives on a tube.

It should be understood that, while the present invention has been described in detail herein, the invention can be embodied otherwise without departing from the principles thereof, and such other embodiments are meant to come within the scope of the present invention as defined by the appended claims.

What is claimed is:

1. A roller comprising:
    an axis of rotation;
    a pair of end plates spaced axially along said axis, and each of said end plates having a plurality of end plate edges disposed about a perimeter thereof;
    a plurality of other plates each having a first portion which extends between said end plates and is attached to respective ones of said end plate edges of said end plates thereby defining a plurality of sides of the roller, each of said other plates further having a second portion which extends from said first portion in a direction radially outwardly of the roller and terminates in a cutting blade, whereby a junction is defined between said first and second portions, and said first portion has an edge opposite said junction; and
    wherein said edge of said first portion of each of said other plates is attached to said junction of an adjacent one of said other plates.

2. A roller according to claim 1 wherein said plurality of sides comprises one of seven, eight, and nine of said sides.

3. A roller according to claim 1 wherein said plurality of sides comprises eight of said sides.

4. A roller according to claim 2 wherein each of said end plate edges has at least one tab which engages a slot in said respective first portion to thereby attach said plurality of sides to said end plates respectively.

5. A roller according to claim 4 further comprising at least one tab on said edge of said first portion of each of said other plates which engages a slot in said respective junction of an adjacent one of said other plates to thereby attach said other plates to adjacent ones respectively of said other plates.

6. A roller according to claim 1 wherein each of said end plate edges has at least one tab which engages a slot in said respective first portion to thereby attach said sides to said end plates respectively.

7. A roller according to claim 6 further comprising at least one tab on said edge of said first portion of each of said other plates which engages a slot in said respective junction of an adjacent one of said other plates to thereby attach said other plates to adjacent ones respectively of said other plates.

8. A roller according to claim 1 wherein said plurality of other plates are identically shaped.

9. A wood chipper comprising a wood chipping chamber, at least one roller for pinching and grasping wood branches and advancing and feeding them into said chamber, and a flywheel rotatably received in said chamber for cutting the wood branches to form chips thereof as said flywheel is rotated, said roller comprising:
   an axis of rotation;
   a pair of end plates spaced axially along said axis, each of said end plates having a plurality of end plate edges disposed about a perimeter thereof;
   a plurality of other plates each having a first portion which extends between said end plates and is attached to respective ones of said end plate edges of said end plates thereby defining a plurality of sides of said roller, each of said other plates further having a second portion which extends from said first portion in a direction radially outwardly of said roller and terminates in a cutting blade, whereby a junction is defined between said first and second portions, and said first portion has an edge opposite said junction; and
   wherein said edge of said first portion of each of said other plates is attached to said junction of an adjacent one of said other plates.

10. A wood chipper according to claim 9 wherein said plurality of sides comprises one of seven, eight, and nine of said sides.

11. A wood chipper according to claim 9 wherein said plurality of sides comprises eight of said sides.

12. A wood chipper according to claim 10 wherein each of said end plate edges has at least one tab which engages a slot in said respective first portion to thereby attach said plurality of sides to said end plates.

13. A wood chipper according to claim 12 further comprising at least one tab on said edge of said first portion of each of said other plates which engages a slot in said junction of said adjacent one of said other plates to thereby attach said other plates to adjacent ones respectively of said other plates.

14. A wood chipper according to claim 9 wherein each of said end plate edges has at least one tab which engages a slot in said respective first portion to thereby attach said sides to said end plates.

15. A wood chipper according to claim 14 further comprising at least one tab on said edge of said first portion of each of said other plates which engages a slot in said junction of said adjacent one of said other plates to thereby attach said other plates to adjacent ones respectively of said other plates.

16. A wood chipper according to claim 9 wherein said plurality of other plates are identically shaped.

\* \* \* \* \*